United States Patent
Han et al.

(10) Patent No.: US 9,839,042 B2
(45) Date of Patent: Dec. 5, 2017

(54) METHOD, APPARATUS, AND SYSTEM FOR RESOURCE SCHEDULING

(71) Applicant: Huawei Technologies Co., Ltd., Shenzhen (CN)

(72) Inventors: Guanglin Han, Shenzhen (CN); Jian Zhang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 254 days.

(21) Appl. No.: 14/622,166

(22) Filed: Feb. 13, 2015

(65) Prior Publication Data
US 2015/0156790 A1 Jun. 4, 2015

Related U.S. Application Data

(63) Continuation of application No. PCT/CN2012/080916, filed on Sep. 3, 2012.

(51) Int. Cl.
*H04W 72/08* (2009.01)
*H04W 72/12* (2009.01)

(52) U.S. Cl.
CPC ..... *H04W 72/087* (2013.01); *H04W 72/1236* (2013.01); *H04W 72/1252* (2013.01)

(58) Field of Classification Search
None
See application file for complete search history.

(56) References Cited

U.S. PATENT DOCUMENTS

2003/0198207 A1* 10/2003 Lee ............... H04W 72/1247 370/337
2003/0232624 A1* 12/2003 Toskala ............ H04W 28/22 455/509

FOREIGN PATENT DOCUMENTS

| CN | 1536904 A | 10/2004 |
|---|---|---|
| CN | 1663296 A | 8/2005 |
| CN | 1756177 | * 4/2006 |

(Continued)

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 10)," 3GPP TS 36.321, V10.5.0, pp. 1-54, $3^{rd}$ Generation Partnership Project, Valbonne, France (Mar. 2012).

*Primary Examiner* — Ayaz Sheikh
*Assistant Examiner* — Sori Aga
(74) *Attorney, Agent, or Firm* — Leydig, Voit & Mayer, Ltd.

(57) ABSTRACT

Embodiments of the present invention provides a method, an apparatus, and a system for resource scheduling, related to the field of communications, configured to reduce the probability of transmitting data to a terminal by a network-side equipment with a too high or too low scheduling rate so as to improve system performance and improve customer experience. The method includes: receiving scheduling information transmitted by a terminal; where the scheduling information includes: a requested scheduling rate requested by the terminal request and/or requested amount of scheduling data requested by the terminal; and determining a scheduling rate according to the scheduling information. The present invention is applicable to a scenario where a network-side equipment transmits data to a terminal.

23 Claims, 8 Drawing Sheets

(56) References Cited

FOREIGN PATENT DOCUMENTS

| | | | |
|---|---|---|---|
| CN | 1756177 | A | 4/2006 |
| CN | 1787684 | A | 6/2006 |
| CN | 1852229 | A | 10/2006 |

\* cited by examiner

METHOD, APPARATUS, AND SYSTEM FOR RESOURCE SCHEDULING

CROSS REFERENCE TO RELATED APPLICATIONS

This application is a continuation of International Patent Application No. PCT/CN2012/080916, filed on Sep. 3, 2012, which is hereby incorporated by reference in its entirety.

TECHNICAL FIELD

The present invention relates to the field of communications and, more particularly, to a method, an apparatus, and a system for resource scheduling.

BACKGROUND

In the prior art, prior to viewing a video, a user needs to download video data to a video display client, then the video display client displays the video. During the process of downloading video data, in order to avoid congestion, a server needs to transmit the video data to the video display client in light of network bandwidth status.

Various transmission paths of various video data packets over a network and various forwarding devices passed may result in various transmission delays of various video data packets over the network, thus, delay variation is generated, therefore, the video cannot be smoothly displayed. In order to eliminate the delay variation, generally, a buffering mechanism is adopted by the client. A buffer area is reserved on the client, the client stores received data packets in the buffer area, sequences data in the buffer area, and performs decoding in accordance with the sequence, so that the video can be displayed smoothly, and the delay variation phenomenon is eliminated. Meanwhile, the client server reports the buffer area state to the server, so as to prevent the server from transmitting too many or too few data which may cause the buffer overflow or buffer overflow underflow occur at the buffer area.

In general, video display rates are dynamic changed during video display. To the server, merely being aware of the client's current buffer amount is not sufficient to estimate subsequent scheduling rates for the client server, therefore, it may be the result that the scheduling rate for transmitting data to the client server determined by the server is so high that the system efficiency is reduced, it may also be the result that the scheduling rate for transmitting data to the client server determined by the server is so low that the video display is suspended or interrupted, thereby degrading customer experience.

SUMMARY

Embodiments of the present invention provide a method, an apparatus, and a system for resource scheduling, so as to reduce the probability of transmitting data to a terminal by a network-side equipment with a too high or too low scheduling rate, thereby improving system performance and user experience.

For the aforementioned purpose, embodiments of the present invention adopt technical solutions hereinafter.

In a first aspect, embodiments of the present invention provide a method for resource scheduling, including: receiving scheduling information transmitted by a terminal, where the scheduling information comprises: a requested scheduling rate requested by the terminal request and/or requested amount of scheduling data requested by the terminal; and determining a scheduling rate according to the scheduling information.

In a first possible implementation mode, the method further includes: allocating a transmission resource to the terminal according to the determined scheduling rate.

Based on the first aspect or the first possible implementation mode of the first aspect, in a second possible implementation mode, the method further includes: transmitting data to be transmitted of a service to the terminal by using the transmission resource.

In a second aspect, embodiments of the present invention provide a method for resource scheduling, including: determining scheduling information, where the scheduling information includes: a requested scheduling rate and/or requested amount of scheduling data requested by a local side; and transmitting the scheduling information to a network-side equipment, so that the network-side equipment determines a scheduling rate according to the scheduling information.

In a first possible implementation mode, the method further includes: receiving data to be transmitted of a service transmitted by the network-side equipment.

In a third aspect, embodiments of the present invention provide a network-side equipment, including: a receiving unit, configured to receive scheduling information transmitted by a terminal, where the scheduling information includes: a requested scheduling rate requested by the terminal request and/or requested amount of scheduling data requested by the terminal; and a determining unit configured to determine a scheduling rate according to scheduling information received by the receiving unit.

In a first possible implementation mode, the network-side further includes: an allocating unit, configured to allocate transmission resource for the terminal according to a scheduling rate determined by the determining unit.

Combined with the third aspect or the first possible implementation mode of the third respect, in a second possible implementation mode, the network-side equipment further includes: a transmitting unit configured to transmit data to be transmitted of a service to the terminal by using the transmission resource allocated by the allocating unit.

In a forth aspect, embodiments of the present invention provide a terminal, including: a determining unit, configured to determine scheduling information, where the scheduling information includes: a requested scheduling rate and/or requested amount of scheduling data requested by a local side; and a transmitting unit, configured to transmit to a network-side equipment the scheduling information determined by the determining unit, so that the network-side equipment determines a scheduling rate according to the scheduling information.

In a first possible implementation mode, the terminal further includes: a receiving unit, configured to receive data to be transmitted of a service transmitted by the network-side equipment.

In a fifth aspect, embodiments of the present invention provide another network-side equipment, including: a receiver, configured to receive scheduling information transmitted by a terminal, where the scheduling information includes: a requested scheduling rate requested by the terminal request and/or requested amount of scheduling data requested by the terminal; and a processor, configured to determine a scheduling rate according to scheduling information received by the receiver.

In a sixth aspect, embodiments of the present invention provide another terminal, including: a processor, configured to determine scheduling information, where the scheduling information includes: a requested scheduling rate and/or requested amount of scheduling data requested by a local side; and a transmitter, configured to transmit to a network-side equipment the scheduling information determined by the processor, so that the network-side equipment determines a scheduling rate according to the scheduling information.

In a seventh aspect, embodiments of the present invention provide a system for resource scheduling, including: a network-side equipment and a terminal, where the network-side equipment is the aforementioned network-side equipment; and the terminal is the aforementioned terminals. Or, the network-side equipment is the other aforementioned network-side equipment, and the terminal is the other aforementioned terminal.

Embodiments of the present invention provide a method, an apparatus, and a system for resource scheduling, where, a terminal determines scheduling information, and transmits the scheduling information to a network-side equipment, the network-side equipment receives the scheduling information, and determines the scheduling rate of a service according to the scheduling information. According to the method, apparatus and system, determining the scheduling rate of transmitting data from the network side according to the scheduling information fed back from the client side is realized, therefore, the probability of transmitting data to a terminal by a network-side equipment with a too high or too low scheduling rate is reduced, thereby improving system performance, system efficiency, and user experience.

BRIEF DESCRIPTION OF DRAWINGS

In order to describe the technical solutions in embodiments of the present invention or prior art more explicitly, the following briefly describes the accompanying drawings required in the description of embodiments. Obviously, the accompanying drawings illustrate only some exemplary embodiments of the present invention, and those skilled in the art can derive other drawings from these drawings without creative efforts.

DESCRIPTION OF EMBODIMENTS

The technical solutions in embodiments of the present invention are described clearly and comprehensively with reference to the accompanying drawings; apparently, the embodiments described are only some exemplary embodiments of the present invention, rather than all embodiments. Other embodiments derived by those skilled in the art on the basis of embodiments of the present invention without any creative effort fall within the protection scope of the present invention.

Figure 1:
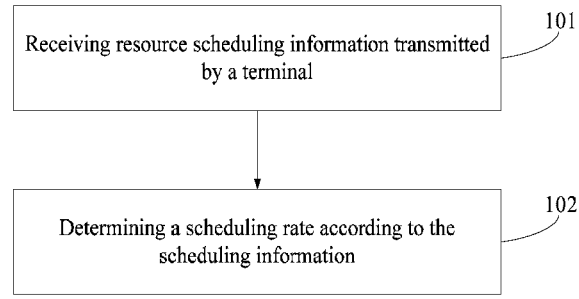
FIG. 1 is a first schematic diagram of a method for resource scheduling according to embodiments of the present invention.

Embodiments of the present invention provide a method for resource scheduling, where operation of the present embodiment may be carried out by a network-side equipment (e.g. a server). As shown in FIG. 1, the method includes:

Step 101, receiving scheduling information transmitted by a terminal.

Where, the scheduling information includes a requested scheduling rate requested by the terminal request and/or requested amount of scheduling data requested by the terminal.

Preferably, the requested scheduling rate is a service data transmission rate required by the terminal when running the service, where the requested amount of scheduling data is amount of data required to be received by the terminal when running the service.

It should be noted that, the requested amount of scheduling data may be any data amount less than the amount of all data to be transmitted of a service, and may also the amount of all data to be transmitted of a service, a terminal determines the requested amount of scheduling data according to demand, which is not limited in embodiments of the present invention.

It should be noted that, in all embodiments of the present invention, a service may be a single service, such as a video service, or be an aggregation of a plurality of services, such as an aggregation of a plurality of audio services, which is not limited in embodiments of the present invention.

Step 102, determining a scheduling rate according to the scheduling information.

In particular, determining, by a network-side equipment, the scheduling rate according to the scheduling information includes: determining, by the network-side equipment, a downlink scheduling rate according to the scheduling information.

In particular, if the scheduling information includes the requested scheduling rate, the determining a scheduling rate according to the scheduling information includes: determining the requested scheduling rate as the scheduling rate.

If the scheduling information includes the requested amount of scheduling data, the determining the scheduling rate according to the scheduling information includes: determining the scheduling rate according to the requested amount of scheduling data and a first preset time value.

Where, the requested transmission rate is determined according to formula: v=S/t, and the requested transmission rate is determined as the scheduling rate.

Where, v is the requested transmission rate, S is the requested amount of scheduling data, and t is the first preset time value.

Optionally, the first preset time value is a time delay value in the quality of service (Qos) information of the service.

It should be noted that, if the scheduling information includes the requested scheduling rate and the requested amount of scheduling data, the requested scheduling rate may be determined as the scheduling rate, alternatively, a requested transmission rate determined according to the requested amount of scheduling data may also be determined as the scheduling rate, which is not limited in embodiments of the present invention.

It should be noted that, if the scheduling information includes the requested scheduling rate and the requested amount of scheduling data, the network-side equipment determines the scheduling rate according to the requested scheduling rate preferably, or determines the scheduling rate according to the requested amount of scheduling data preferably, which is preset.

Preferably, the scheduling rate is determined according to the scheduling information and a preset maximum transmission rate.

In a case that the scheduling information includes a requested scheduling rate, make a comparison between the requested scheduling rate and the preset maximum transmission rate, if the requested scheduling rate is greater than the preset maximum transmission rate, more preferably, determine the scheduling rate as the preset maximum transmission rate. If the requested scheduling rate is less than the preset maximum transmission rate, determine the requested scheduling rate as a minimum rate value of the scheduling rate, and determine the preset maximum transmission rate as a maximum rate value of the scheduling rate, meanwhile, determine a value between the minimum rate value and the maximum rate value as the scheduling rate. Preferably, determine the requested scheduling rate as the scheduling rate.

In a case that the scheduling information includes the requested amount of scheduling data, firstly, determine a requested transmission rate according to the requested amount of scheduling data and the first preset time value; then, determine the scheduling rate according to the requested transmission rate and the preset maximum transmission rate.

In particular, make a comparison between the requested transmission rate and the preset maximum transmission rate, if the requested transmission rate is greater than the preset maximum transmission rate, preferably, determine the preset maximum transmission rate as the scheduling rate. If the requested transmission rate is less than the preset maximum transmission rate, determine the requested transmission rate as a minimum rate value of the scheduling rate, and determine the preset maximum transmission rate as a maximum value of the scheduling rate, meanwhile, determine a value between the minimum rate value and the maximum rate value as the scheduling rate. Preferably, determine the requested transmission rate as the scheduling rate.

It should be noted that, a first preset time value is a preset time value.

It should be noted that, Qos information of the service is obtained when the service is being requested, where a time delay value in the Qos information varies depend on different priorities of services.

It should be noted that, in all embodiments of the present invention, a preset maximum transmission rate is a maximum transmission rate of transmitting data to a terminal and is preset by the network-side equipment.

Optionally, the scheduling rate is determined according to the scheduling information, the preset maximum transmission rate and the service state information.

Where, the service state information includes at least one of the states hereinafter: a state in which the service is suspended; a state in which the service is ended; a state of starting downloading service data to a buffer area; a state in which amount of data to be run of the service stored in a buffer area is less than or equal to a first preset value; a state in which amount of data to be run stored in a buffer area is greater than or equal to a second preset value; a state in which a time length for running, which corresponds to amount of data to be run of a service stored in a buffer area, is less than or equal to a third preset value; a state in which a time length for running, which corresponds to amount of data to be run of a service stored in a buffer area, is greater than or equal to a forth preset value; and a state of all data to be run of a service has been buffered in a buffer area.

In particular, if the service state information includes the state in which the service is suspended or the state of starting downloading service data to the buffer area, raise the scheduling priority of the service, and determine a rate no greater than the preset maximum transmission rate as the scheduling rate.

Figure 2:
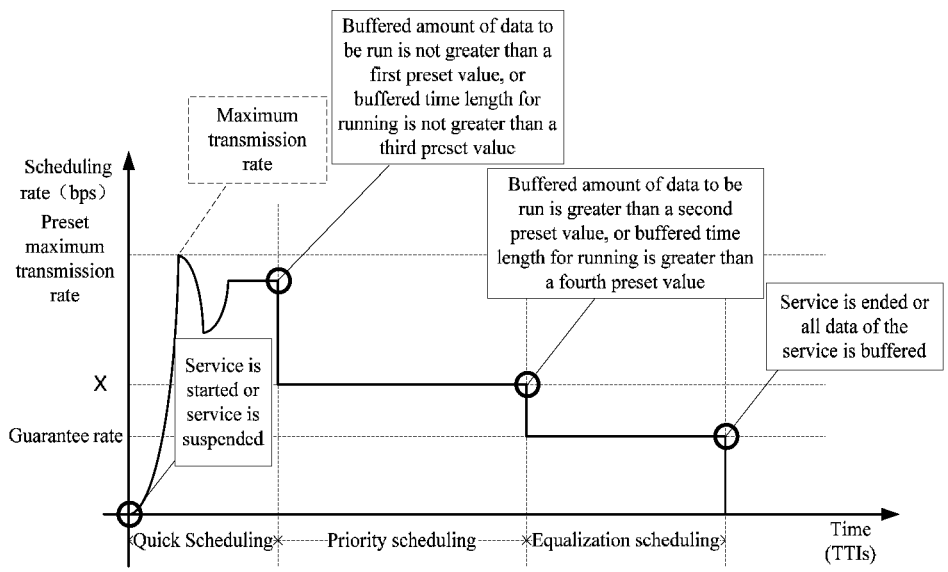
FIG. 2 is a second schematic diagram for resource scheduling according to embodiments of the present invention.

Where, when the service is in a suspended state or in a state of starting downloading service data to the buffer area, determine a rate no greater than the preset maximum transmission rate as the scheduling rate. Preferably, regardless of whether the scheduling request in the scheduling information, or the requested transmission rate obtained according to the requested amount of scheduling data, is greater than or equal to or less than the preset maximum transmission rate, determine the preset maximum transmission rate as the scheduling rate, as shown in FIG. 2. Meanwhile, raise the scheduling priority of the service.

It should be noted that, if, at current moment, the scheduling rate allocated by the network-side equipment to the terminal cannot reach the preset maximum transmission rate, determine the maximum transmission rate, which can be allocated by the network-side equipment to the terminal at current moment, as the scheduling rate.

If the service state information includes: the state in which amount of data to be run of the service stored in the buffer area is less than or equal to the first preset value, or the state in which the time length for running, which corresponds to the amount of data to be run of the service stored in the buffer area, is less than or equal to the third preset value, raise a scheduling priority of the service, and determine a rate no greater than the preset maximum transmission rate as the scheduling rate.

Where, when buffering of the service has been started but the buffer amount is little, in a case that the requested scheduling rate in the scheduling information, or the requested transmission rate obtained according to the requested amount of scheduling data is greater than the preset maximum transmission rate, the network-side equipment determines the preset maximum transmission rate as the maximum rate value of the scheduling rate, and determine a rate no greater than the preset maximum transmission rate as the scheduling rate. At this time, the network-side equipment may determine a transmission rate slightly less than the preset maximum transmission rate as the scheduling rate according to the actual condition of its self, as shown in FIG. 2 for reference. If the requested scheduling rate in the scheduling information, or the requested transmission rate obtained according to the requested amount of scheduling data is no greater than the preset maximum transmission rate, the network-side equipment determines the preset maximum transmission rate as the maximum rate value of the scheduling rate, determines the requested scheduling rate in the scheduling information or the request transmission rate obtained according to the requested amount of scheduling data as the minimum rate value of the scheduling rate, and determines a value between the minimum rate value and the maximum rate value as the scheduling rate.

If the service state information includes the state in which the amount of data to be run stored in the buffer area is greater than or equal to the second preset value, or the state in which the time length for running, which corresponds to the amount of data to be run of the service stored in the buffer area, is greater than or equal to the forth preset value, reduce a scheduling priority of the service, and, in a case that the requested scheduling rate in the scheduling information or the requested transmission rate obtained according to the requested amount of scheduling data is no greater than a guarantee rate, determine the requested scheduling rate in the scheduling information or a requested transmission rate obtained according to the requested amount of scheduling data as the maximum rate value of the scheduling rate; and, in a case that the requested scheduling rate in the scheduling information or the requested transmission rate obtained according to the requested amount of scheduling data is greater than the guarantee rate, determine a rate no greater than the guarantee rate as the scheduling rate.

Where, the guarantee rate is a minimum transmission rate guaranteeing normal running of the service.

When the service state information is the state in which the amount of data to be run stored in the buffer area is greater than or equal to the second preset value, or the state in which the time length for running, which corresponds to the amount of data to be run of the service stored in the buffer area, is greater than or equal to the forth preset value, it indicates that a buffer has buffered an enormous amount of data to be run of the service, at this time, the scheduling priority of the service may be lowered, and the scheduling rate is lowered, i.e., the transmission rate no greater than the guarantee rate is determined as the scheduling rate, as shown in FIG. 2 for reference.

Certainly, determining, by the network-side equipment, the scheduling rate according to the scheduling information further includes: determining, by the network-side equipment, an uplink scheduling rate according to the scheduling information. At this time, the scheduling information includes the requested scheduling rate or the requested amount of scheduling data. The procedure of determining the uplink scheduling rate by the network-side equipment according to the scheduling information and the procedure of determining the downlink scheduling rate by the network-side equipment according to the scheduling information are the same, which is not repeated herein.

Embodiments of the present invention provide a method for resource scheduling. After receiving the scheduling information, the network-side equipment determines the service scheduling rate according to the scheduling information, and allocates transmission resource to the terminal by utilizing the scheduling rate. According to the method, determining the scheduling rate of transmitting data from the network side according to the scheduling information fed back from the client side is realized, therefore, the probability of transmitting data to a terminal by a network-side equipment with a too high or too low scheduling rate is reduced, thereby improving system performance, system efficiency, and user experience.

Figure 3:
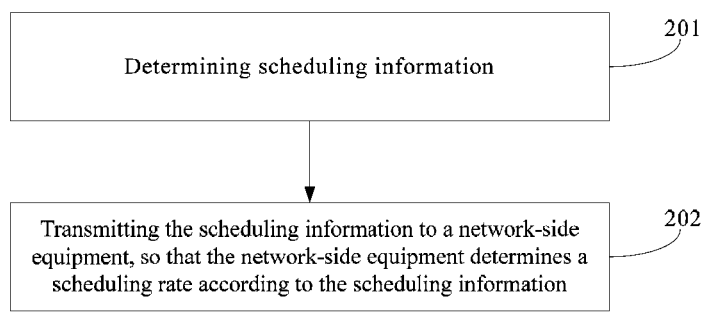
FIG. 3 is a third schematic diagram of a method for resource scheduling according to embodiments of the present invention.

Embodiments of the present invention provide a method for resource scheduling, where operation of the present embodiment may be carried out by a terminal. As shown in FIG. 3, it includes:

Step 201, determining scheduling information.

Where, the scheduling information includes a requested scheduling rate and/or requested amount of scheduling data requested by a local side.

Where, the requested scheduling rate is a service data transmission rate required by the terminal when running the service, where the requested amount of scheduling data is amount of data required to be received by the terminal when running the service.

Where, if the scheduling information includes a requested scheduling rate, the requested scheduling rate can be determined according to the following formula: $v_q=(S_m-S_y-S_h)/(T_z-T_y)$, where $v_q$ is the requested scheduling rate, $S_m$ is selected data amount, $S_y$ is a amount of data has already been run in the selected data amount, $S_h$ is amount of data to be run in a buffer, $T_z$ is total run time of the service corresponding to the selected data amount, and $T_y$ is time for which the service corresponding to the selected data amount has already been run.

If the scheduling information includes the requested amount of scheduling data, the requested amount of scheduling data is determined according to a following formula: $S=S_m-S_y-S_h$, where $S_m$ is selected data amount, $S_y$ is a amount of data has already been run in the selected data amount, $S_h$ is amount of data to be run in a buffer.

It should be noted that, the selected data amount may be entire data amount of a service selected by the terminal, or be partial data amount of a service selected by the terminal. Total service run time corresponding to the selected data amount corresponds to the selected data amount. If the selected data amount is the entire data amount of the service, the total service run time corresponding to the selected data amount is the time required for running the entire data amount of the entire service. If the selected data amount is the partial data amount of the service, the total service run time corresponding to the selected data amount is the time required for running the selected partial data amount of the service.

Figure 4:
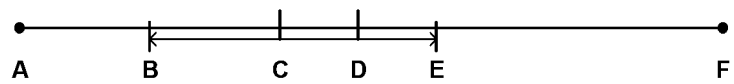
FIG. 4 is a schematic diagram of an example for determining scheduling information according to embodiments of the present invention.

For example, a service of which data needs to be transmitted by the terminal is a video service, where the data amount of the service is represented as S, and the run time of the service is represented as T. As shown in FIG. 4, A represents the beginning position of displaying the video, where F is the ending position of displaying the video; B and E are certain parts during the video display process; C is the position of displaying the video at the current moment; and D is a buffered position capable of displaying the video at the current moment. If the data amount from B to E is the selected data amount, the data amount from B to C is amount of data has already been run in the selected data amount, the data amount from C to D is the amount of data to be run in a buffer, run time of the service from B to E is the total run time of the service corresponding to the selected data amount, and run time of the service from B to C is time for which the service corresponding to the selected data amount has already been run. At this point, if the scheduling information includes the requested scheduling rate, the requested scheduling rate is $V_q=(S_m-S_y-S_h)/(T_z-T_y)=S_{B-E}-S_{B-C}-S_{C-D}/T_{B-E}-T_{B-C}$. Where $S_{B-E}$ represents data amount from B to E, $S_{B-C}$ represents data amount from B to C, $S_{C-D}$ represents data amount from C to D, $T_{B-E}$ represents run time corresponding to data amount from B to E, and $T_{B-C}$ represents time for which the service has already been run within the run time corresponding to data amount from B to E.

Step 202, transmitting the scheduling information to a network-side equipment, so that the network-side equipment determines a scheduling rate according to the scheduling information.

Embodiments of the present invention provide a method for resource scheduling. In the method, the terminal determines scheduling information according to data amount ready to be transmitted of the service, and transmits the scheduling information to the network-side equipment, so that the network-side equipment determines the scheduling rate according to the received scheduling information. According to the method, the probability of transmitting data to a terminal by a network-side equipment with a too high or too low scheduling rate is reduced, thereby improving system performance and system efficiency, and further reducing user's waiting time, thus improving user experience.

Figure 5:
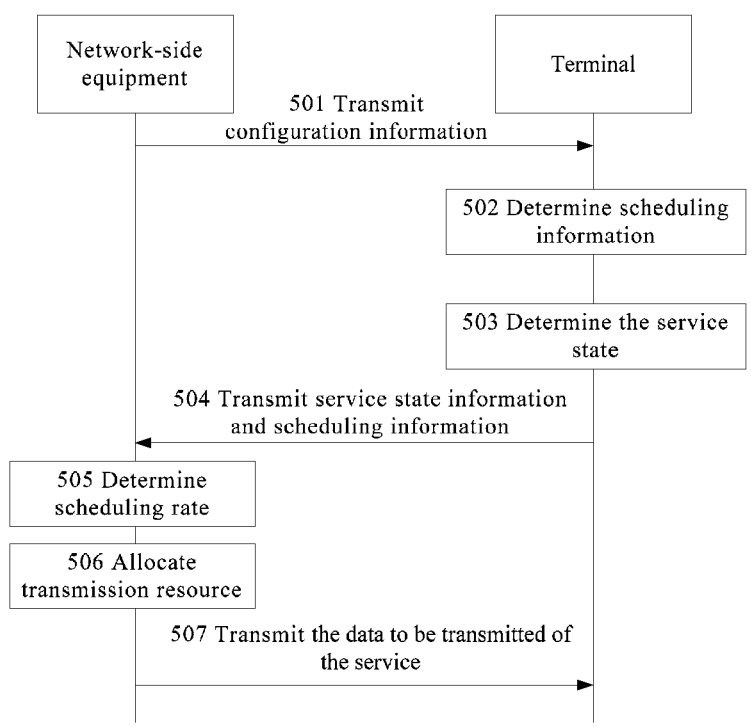
FIG. 5 is a forth schematic diagram of a method for resource scheduling according to embodiments of the present invention.

Embodiments of the present invention provide a method for determining a scheduling rate, as shown in FIG. 5, the method includes:

Step 501, a network-side equipment transmits configuration information to the terminal, and the terminal receives the configuration information transmitted by the network-side equipment.

Where, the configuration information includes a triggering condition used for triggering, by the network-side equipment, the terminal to determine and transmit the scheduling information.

The triggering condition includes at least one of the conditions as follows: amount of data to be run stored in a buffer area is zero; downloading data of a service to a buffer area is started; amount of data to be run stored in a buffer area is less than or equal to a first preset value; amount of data to be run stored in a buffer area is greater than or equal to a second preset value, where the second preset value is greater than the first preset value; all data to be run of a service has been buffered in a buffer area; a feedback cycle of the scheduling information is arrived; a time length for running, which corresponds to amount of data to be run stored in a buffer area, is zero; a time length for running, which corresponds to amount of data to be run stored in a buffer area, is less than or equal to a third preset value; and a time length for running, which corresponds to amount of data to be run stored in a buffer area, is greater than or equal to a forth preset value, where the forth preset value is greater than the third preset value.

It should be noted that, in all embodiments of the present invention, a time for running is a run time during which running the service by the terminal can be supported by the amount of data to be run.

It should be noted that, in all embodiments of the present invention, a time for running is a maximum run time during which running the service by the terminal can be supported by the amount of data to be run.

It should be noted that, in all embodiments of the present invention, the first preset value, the second preset value, the third preset value, and the forth preset value are all preset, or are configured to the terminal by the network.

Step 502, which is the same as step 201.

For example, determine the scheduling information, if any one triggering condition in the configuration information has been met.

Step 503, a terminal determines the state of the service.

Where, the service state information is the current state of the service. The service state information includes at least one of the states as follows: a state in which the service is suspended; a state in which the service is ended; a state of starting downloading service data to a buffer area; a state in which amount of data to be run of the service stored in a buffer area is less than or equal to a first preset value; a state in which amount of data to be run stored in a buffer area is greater than or equal to a second preset value; a state in which a time length for running, which corresponds to amount of data to be run of a service stored in a buffer area, is less than or equal to a third preset value; a state in which a time length for running, which corresponds to amount of data to be run of a service stored in a buffer area, is greater than or equal to a forth preset value; and a state of all data to be run of a service has been buffered in a buffer area.

It should be noted that, in all embodiments of the present invention, the service being in the suspended state indicates a state that there isn't any data to be run stored in the service buffer area, which results in the service waiting for data transmitted from the network-side equipment to the terminal. For example, when the amount of data to be run stored in the buffer area is null or the time length for running corresponding to the amount of data to be run stored in the buffer area is zero, the service is in a suspended state.

In particular, when a terminal determines that the service is in any one of the aforementioned states, the terminal transmits corresponding service state information to the network-side equipment, so that the network-side equipment knows the current service state corresponding to the service, therefore the scheduling rate can be determined.

Step 504, the terminal transmits the service state information and the scheduling information to the network-side equipment, and the network-side equipment receives the scheduling information and the service state information transmitted by the terminal.

Optionally, the terminal transmits the service state information together with the scheduling information to the network-side equipment. It is possible to encapsulate the scheduling information and the service state information into report information, and transmit to the network-side equipment the report at a medium/media access control (MAC) layer or a radio resource control (RRC) layer.

It should be noted that, the terminal may individually transmit the service state information to a network-side equipment, which is not limited in embodiments of the present invention.

It should be noted that, in all embodiments of the present invention, the scheduling information included in the report information may be an index value, so that the network-side equipment can obtain a range of requested scheduling rates or a range of requested amount of scheduling data in accordance with an index value in the report information after receiving the report information, and determine a scheduling rate in accordance with the requested scheduling rate. Alternatively, the network-side equipment may obtain a corresponding range of requested transmission rates in accordance with the range of requested amount of scheduling data, and determine the scheduling rate in accordance with the range of the obtained requested transmission rates. At this time, both the network-side equipment and the terminal have been preset with the same index value and the corresponding range of the requested transmission rate or of requested amount of scheduling data, as shown in Table 1 and Table 2 hereinafter, where Table 1 shows various requested scheduling rates correspond to various index values, and Table 2 shows various requested amount of scheduling data correspond to various index values. Certainly, the scheduling information in the report information may also be a specific value of the requested transmission rate or of the requested amount of scheduling data. The specific manner of including the scheduling information in the report information is not limited in embodiments of the present invention.

TABLE 1

| Index value | Range of requested scheduling rates (bps) |
| --- | --- |
| 1 | 1M~2M |
| 2 | 2M~4M |
| 3 | 4M~8M |
| . . . | . . . |

TABLE 2

| Index value | Range of requested scheduling data amounts (Bytes) |
| --- | --- |
| 1 | 1M~2M |
| 2 | 2M~4M |
| 3 | 4M~8M |
| . . . | . . . |

Figure 6:
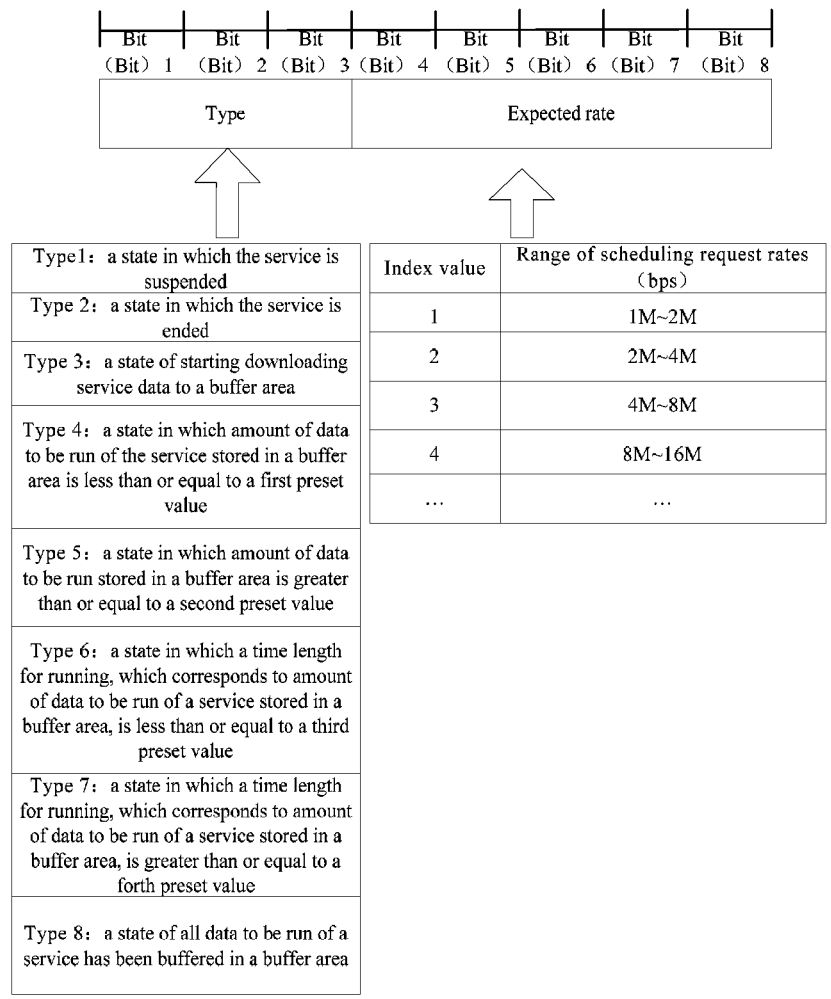
FIG. 6 is a schematic diagram of encapsulating packet information according to embodiments of the present invention.

Illustratively, take an MAC layer report as an example, the scheduling information includes the requested scheduling rate, and the service state information and the index value corresponding to the requested scheduling rate are encapsulated in the report information, as shown in FIG. 6. The report information has 8 Bits (bits) in total, where 3 Bits are occupied by the service state information represented with various types, and 5 Bits are occupied by the scheduling information represented with an expected rate.

The service state in which the service is suspended is represented with type 1; the state in which the service is ended is represented with type 2; the state of starting downloading service data to a buffer area is represented with type 3; the state in which amount of data to be run of the service stored in a buffer area is less than or equal to a first preset value is represented with type 4; the state in which amount of data to be run of the service stored in a buffer area is greater than or equal to a second preset value is represented with type 5; the state in which a time length for running, which corresponds to amount of data to be run of a service stored in a buffer area, is less than or equal to a third preset value is represented with type 6; the state in which a time length for running, which corresponds to amount of data to be run of a service stored in a buffer area, is greater than or equal to a forth preset value is represented with type 7; and the state of all data to be run of a service has been buffered in a buffer area is represented with type 8.

It should be noted that, at this point both the terminal and the network-side equipment are preset with mapping information between various types and differing service state information.

The terminal encapsulates the current service state information and the scheduling information into the report information, and transmits the service state information and the scheduling information to the network-side equipment.

The network-side equipment receives the scheduling information and the service state information transmitted by the terminal.

In particular, if what is received is the report information, the network-side equipment obtains the service type recorded in the report information, based on which, looks up the mapping information and obtains the service state information transmitted by the terminal. Based on the index value of the expected rate in the report information, it is possible to obtain the corresponding requested scheduling rate or the requested amount of scheduling data by looking up the mapping table.

If the scheduling information and the service state information are received respectively, it is possible to obtain a transmission rate expected by the terminal based on the scheduling information, and obtain the current state of the service based on the service state information.

Step 505, which is the same as step 102, and will not be repeated herein.

Step 506, allocate a transmission resource to the terminal according to the determined scheduling rate.

In particular, if the scheduling rate is a downlink scheduling rate, the network-side equipment allocates a downlink transmission resource to the terminal according to the downlink scheduling rate, that is, the network-side equipment allocates, to the terminal and according to the downlink scheduling rate, the downlink transmission resource which is used for transmitting the data to be transmitted to the terminal by the network-side equipment.

If the scheduling rate is an uplink scheduling rate, the network-side equipment allocates an uplink transmission resource to the terminal according to the uplink scheduling rate, that is, the network-side equipment allocates, to the terminal and according to the uplink scheduling rate, the uplink transmission resource which is used transmitting data to the network-side equipment by the terminal. After the network-side equipment allocates to the terminal the uplink transmission resource, the terminal transmits data to the network-side equipment by utilizing the uplink transmission resource.

Step 507, the network-side equipment transmits the data to be transmitted of the service to the terminal by utilizing the transmission resource, and the terminal receives the data to be transmitted of the service transmitted by the network-side equipment.

In particular, after determining the downlink transmission resource, the network-side equipment transmits the data to be transmitted of the service to the terminal by utilizing the downlink transmission resource, and the terminal receives the data to be transmitted by the network-side equipment.

It should be noted that, when the level of the rate at which the network-side equipment transmits the data to be transmitted to the terminal differs from the level of the determined scheduling rate, it is possible to convert the scheduling rate to the level of the rate at which the network-side equipment transmits the service data information to be transmitted to the terminal. For example, the rate at which the network-side equipment transmits the service data information to be transmitted to the terminal is at a millisecond level, and the scheduling rate is at a second level, the scheduling rate at the second level may be converted to a rate at a millisecond level, and the service data information to be transmitted is transmitted to the terminal based on the rate at the millisecond level.

Embodiments of the present invention provide a method for resource scheduling, where, the terminal transmits the scheduling information and the service state information to the network-side equipment, the network-side equipment receives the scheduling information and the service state information, determines the scheduling rate of the service based on the scheduling information, the service state information and the preset maximum transmission rate, and transmits the service's remaining transmission data information by utilizing the scheduling rate. According to the method, determining the scheduling rate of transmitting data from the network side according to the scheduling information fed back from the client side is realized, therefore, the probability of transmitting data to a terminal by a network-side equipment with a too high or too low scheduling rate is reduced, thereby improving system performance and system efficiency, and further reducing user's waiting time, thus improving user experience.

Figure 7:
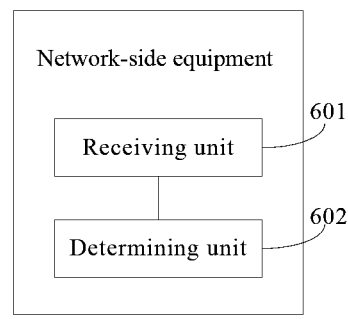
FIG. 7 is a first block diagram of a network-side equipment according to embodiments of the present invention.

Embodiments of the present invention provide a network-side equipment. The network-side equipment may be a base station, a server, etc, and it may be employed to realize the aforementioned methods. As shown in FIG. 7, the network-side equipment provided by the embodiment includes: a receiving unit 601, configured to receive scheduling information transmitted by a terminal.

Where, the scheduling information includes a requested scheduling rate requested by the terminal request and/or requested amount of scheduling data requested by the terminal.

In particular, the requested scheduling rate is a service data transmission rate required by the terminal when running the service, where the requested amount of scheduling data is amount of data required to be received by the terminal when running the service.

A determining unit 602, configured to determine a scheduling rate according to scheduling information received by the receiving unit 601.

Optionally, the determining unit 602 is specifically configured to determine a downlink scheduling rate according to the scheduling information.

In particular, the determining unit 602 is specifically configured to determine the requested scheduling rate as the scheduling rate, in a case that the scheduling information includes the requested scheduling rate.

Alternatively, determine the scheduling rate according to the requested amount of scheduling data and a first preset time value, in a case that the scheduling information includes the requested amount of scheduling data.

The determining unit 602 is specifically configured to, in a case that the scheduling information includes the requested amount of scheduling data, determine requested transmission rate according to a formula: $v=S/t$, and determine the requested transmission rate as the scheduling rate.

Where, v is the requested transmission rate, S is the requested amount of scheduling data, and t is the first preset time value.

Preferably, the determining unit 602 is specifically configured to determine the scheduling rate according to the scheduling information and a preset maximum transmission rate.

In particular, the determining unit 602 is specifically configured to, in a case that the scheduling information includes the requested scheduling rate, if the requested scheduling rate is greater than the preset maximum transmission rate, determine the preset maximum transmission rate as the scheduling rate. If the requested scheduling rate is less than the preset maximum transmission rate, determine the requested scheduling rate as the minimum rate value of the scheduling rate, determine the preset maximum transmission rate as the maximum rate value of the scheduling rate, and determine a value between the minimum rate value and the maximum value as the scheduling rate.

In a case that the scheduling information includes the requested amount of scheduling data, determine a requested transmission rate according to the requested amount of scheduling data and the first preset time value; and if the requested transmission rate is greater than the preset maximum transmission rate, determine the preset maximum transmission rate as the scheduling request. If the requested transmission rate is less than the preset maximum transmission rate, determine the requested transmission rate as a minimum rate value of the scheduling rate, determine the preset maximum transmission rate as a maximum rate value of the scheduling rate, and determine a value between the minimum rate value and the maximum value as the scheduling rate.

Figure 8:
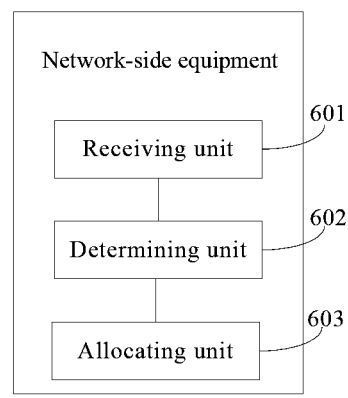
FIG. 8 is a second block diagram of a network-side equipment according to embodiments of the present invention.

The aforementioned network-side equipment, as shown in FIG. 8, further includes: an allocating unit 603, configured to allocate a transmission resource for the terminal according to a scheduling rate determined by the determining unit 602.

Optionally, the allocating unit 603 is specifically configured to allocate a downlink transmission resource for the terminal according to the determined downlink scheduling rate.

Figure 9:
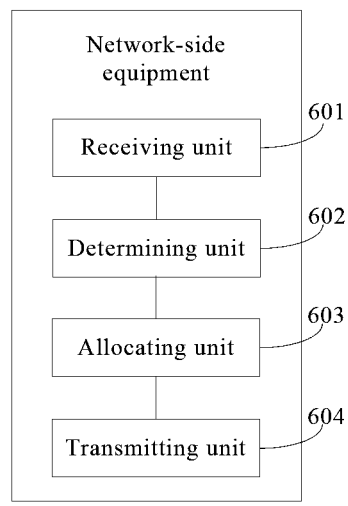
FIG. 9 is a third block diagram of a network-side equipment according to embodiments of the present invention.

The aforementioned network-side equipment, as shown in FIG. 9, further includes: a transmitting unit 604, configured to transmit data to be transmitted of a service to the terminal by using the transmission resource allocated by the allocating unit 603.

The aforementioned transmitting unit 604 is also configured to transmit configuration information to the terminal.

Where, the configuration information includes a triggering condition used for triggering the terminal to determine and transmit the scheduling information.

In particular, the triggering condition includes at least one of the conditions as follows: amount of data to be run stored in a buffer area is zero; downloading data of a service to a buffer area is started; amount of data to be run stored in a buffer area is less than or equal to a first preset value; amount of data to be run stored in a buffer area is greater than or equal to a second preset value, where the second preset value is greater than the first preset value; all data to be run of a service has been buffered in a buffer area; a feedback cycle of the scheduling information is arrived; a time length for running, which corresponds to amount of data to be run stored in a buffer area, is zero; a time length for running, which corresponds to amount of data to be run stored in a buffer area, is less than or equal to a third preset value; and a time length for running, which corresponds to amount of data to be run stored in a buffer area, is greater than or equal to a forth preset value, where the forth preset value is greater than the third preset value.

It should be noted that, the first preset value, the second preset, the third preset value, and the forth preset value are all preset.

The aforementioned receiving unit 601 is also configured to receive service state information transmitted by the terminal, where the service state information is the current state of the service.

Where, the service state information includes at least one of the states as follows: a state in which the service is suspended; a state in which the service is ended; a state of starting downloading service data to a buffer area; a state in which amount of data to be run of the service stored in a buffer area is less than or equal to a first preset value; a state in which amount of data to be run stored in a buffer area is greater than or equal to a second preset value; a state in which a time length for running, which corresponds to amount of data to be run of a service stored in a buffer area, is less than or equal to a third preset value; a state in which a time length for running, which corresponds to amount of data to be run of a service stored in a buffer area, is greater than or equal to a forth preset value; and a state of all data to be run of a service has been buffered in a buffer area.

Optionally, the determining unit 602 is specifically configured to determine the scheduling rate according to the scheduling information, the service state information, and the preset maximum transmission rate received by the receiving unit 601.

In particular, if the service state information includes the state in which the service is suspended or the state of starting downloading service data to the buffer area, the determining unit 602 shall raise the scheduling priority of the service, and determine a rate no greater than the preset maximum transmission rate as the scheduling rate.

Where, when the service is in a suspended state or a state of starting downloading service data to a buffer area, the determining unit 602 determines a rate no greater than the preset maximum transmission rate as the scheduling rate. Preferably, regardless of whether the requested scheduling rate in the scheduling information, or the requested transmission rate obtained according to the requested amount of scheduling data is greater than or equal to or less than the preset maximum transmission rate, determine the preset maximum transmission rate as the scheduling rate. Meanwhile, raise the scheduling priority of the service.

It should be noted that, if, at the current moment, in the network-side equipment, the scheduling rate capable of being allocated to the terminal cannot reach the preset maximum transmission rate, determine the maximum transmission rate, which can be allocated by the network-side equipment to the terminal at current moment, as the scheduling rate.

If the service state information includes: the state in which amount of data to be run of the service stored in the buffer area is less than or equal to the first preset value, or the state in which the time length for running, which corresponds to the amount of data to be run of the service stored in the buffer area, is less than or equal to the third preset value, the determining unit 602 shall raise the scheduling priority of the service, and determine a rate no greater than the preset maximum transmission rate as the scheduling rate.

Where, when buffering of the service has been started but the buffer amount is little, in a case that the requested scheduling rate in the scheduling information or the requested transmission rate obtained according to the requested amount of scheduling data is greater than the preset maximum transmission rate, the determining unit 602 determines the preset maximum transmission rate as the maximum rate value of the scheduling rate, and determine a rate no greater than the preset maximum transmission rate as the scheduling rate. At this time, preferably, the determining unit 602 may determine a rate slightly less than the preset maximum transmission rate as the scheduling rate. In a case that the requested scheduling rate in the scheduling information or the requested transmission rate obtained according to the requested amount of scheduling data is no greater than the preset maximum transmission rate, the determining unit 602 determines the preset maximum transmission rate as the maximum rate value of the scheduling rate, determines the requested scheduling rate in the scheduling information or the request transmission rate obtained according to the data amount of the request scheduling as the minimum rate value of the scheduling rate, and determines a value between the minimum rate value and the maximum rate value as the scheduling rate.

If the service state information includes the state in which the amount of data to be run stored in the buffer area is greater than or equal to the second preset value, or the state in which the time length for running, which corresponds to the amount of data to be run of the service stored in the buffer area, is greater than or equal to the forth preset value, the determining unit 602 reduces a scheduling priority of the service, and, in a case that the requested scheduling rate in the scheduling information or the requested transmission rate obtained according to the requested amount of scheduling data is no greater than a guarantee rate, the determining unit 602 determines the requested scheduling rate in the scheduling information or a requested transmission rate obtained according to the requested amount of scheduling data as the maximum rate value of the scheduling rate; and, in a case that the requested scheduling rate in the scheduling information or the requested transmission rate obtained according to the requested amount of scheduling data is greater than the guarantee rate, the determining unit 602 determines a rate no greater than the guarantee rate as the scheduling rate.

Where, the guarantee rate is a minimum transmission rate guaranteeing normal running of the service.

When the service state information is the state in which the amount of data to be run stored in the buffer area is greater than or equal to the second preset value, or the state in which the time length for running, which corresponds to the amount of data to be run of the service stored in the buffer area, is greater than or equal to the forth preset value, it indicates that a buffer has buffered an enormous amount of data to be run of the service, at this time, the determining unit 602 reduces the scheduling priority of the service, and reduces the scheduling rate, i.e., the transmission rate no greater than the guarantee rate is determined as the scheduling rate.

Embodiments of the present invention provide a network-side equipment. After receiving the scheduling information and service state information, the network-side equipment determines the service scheduling rate according to the scheduling information and the service state information, and allocates transmission resource to the terminal by utilizing the scheduling rate, and transmits the data to be transmitted of the service according to the transmission resource. According to the method, determining the scheduling rate of transmitting data from the network side according to the scheduling information fed back from the client side is realized, therefore, the probability of transmitting data to a terminal by a network-side equipment with a too high or too low scheduling rate is reduced, thereby improving system performance and system efficiency, and further reducing user's waiting time, thus improving user experience.

Figure 10:
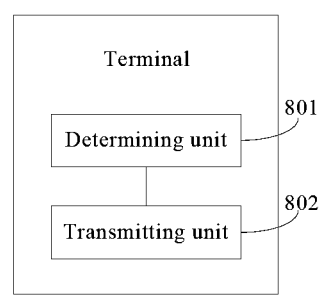
FIG. 10 is a first block diagram of a terminal according to embodiments of the present invention.

Embodiments of the present invention provide a terminal, which may be configured to realize the aforementioned methods. As shown in FIG. 10, the terminal includes: a determining unit 801, configured to determine scheduling information.

Where, the scheduling information includes a requested scheduling rate and/or requested amount of scheduling data requested by a local side.

In particular, the requested scheduling rate is a service data transmission rate required by the terminal when running the service, where the requested amount of scheduling data is amount of data required to be received by the terminal when running the service.

Where, the requested scheduling rate may be determined according to the following formula: $v_q=(S_m-S_y-S_h)/(T_z-T_y)$, where $v_g$ is the requested scheduling rate, $S_m$ is selected data amount, $S_y$ is a amount of data has already been run in the selected data amount, $S_h$ is amount of data to be run in a buffer, $T_z$ is total run time of the service corresponding to the selected data amount, and $T_y$ is time for which the service corresponding to the selected data amount has already been run.

The requested amount of scheduling data is determined according to the following formula: the requested amount of scheduling data is determined according to a following formula: $S=S_m-S_y-S_h$, where $S_m$ is selected data amount, $S_y$ is a amount of data has already been run in the selected data amount, $S_h$ is amount of data to be run in a buffer.

A transmitting unit 802, configured to transmit to a network-side equipment the scheduling information determined by the determining unit 801, so that the network-side equipment determines a scheduling rate according to the scheduling information.

Figure 11:
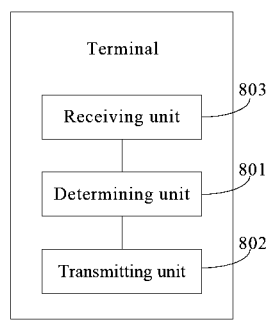
FIG. 11 is a second block diagram of a terminal according to embodiments of the present invention.

As shown in FIG. 11, the aforementioned terminal also includes: a receiving unit 803, configured to receive data to be transmitted of a service transmitted by the network-side equipment.

The receiving unit 803 is also configured to receive configuration information transmitted by the network-side equipment.

Where, the configuration information includes a triggering condition used for triggering determination and transmitting of the scheduling information.

In particular, the triggering condition includes at least one of the conditions as follows: amount of data to be run stored in a buffer area is zero; downloading data of a service to a buffer area is started; amount of data to be run stored in a buffer area is less than or equal to a first preset value; amount of data to be run stored in a buffer area is greater than or equal to a second preset value, where the second preset value is greater than the first preset value; all data to be run of a service has been buffered in a buffer area; a feedback cycle of the scheduling information is arrived; a time length for running, which corresponds to amount of data to be run stored in a buffer area, is zero; a time length for running, which corresponds to amount of data to be run stored in a buffer area, is less than or equal to a third preset value; and a time length for running, which corresponds to amount of data to be run stored in a buffer area, is greater than or equal to a forth preset value, where the forth preset value is greater than the third preset value.

The receiving unit 803 is specifically configured to, during the procedure of running the service, determine the scheduling information once any one triggering condition in the configuration information has been met.

The transmitting unit 802 is also configured to transmit the service state information to the network-side equipment.

Where, the service state information is the current state of the buffer area corresponding to the service.

In particular, the service state information includes at least one of the states as follows: a state in which the service is suspended; a state in which the service is ended; a state of starting downloading service data to a buffer area; a state in which amount of data to be run of the service stored in a buffer area is less than or equal to a first preset value; a state in which amount of data to be run stored in a buffer area is greater than or equal to a second preset value; a state in which a time length for running, which corresponds to amount of data to be run of a service stored in a buffer area, is less than or equal to a third preset value; a state in which a time length for running, which corresponds to amount of data to be run of a service stored in a buffer area, is greater than or equal to a forth preset value; and a state of all data to be run of a service has been buffered in a buffer area.

Embodiments of the present invention provide a terminal, where, during a procedure of running a services, when a triggering condition is met, the terminal determines scheduling information and service state information according to the remaining transmission data amount of the service, transmits the scheduling information and service state information to a network-side equipment, so that the network-side equipment determines a scheduling rate according to the received scheduling information and service state information, determines the transmission resource allocated to the terminal according to the scheduling rate, and transmits the data to be transmitted of the service according to the transmission resource, therefore, the probability of transmitting data to a terminal by a network-side equipment with a too high or too low scheduling rate is reduced, thereby improving system performance and system efficiency, and further reducing user's waiting time, thus improving user experience.

Figure 12:
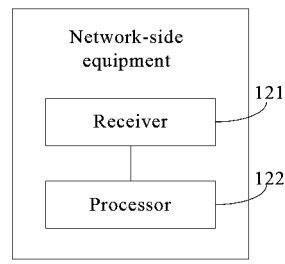
FIG. 12 is a first block diagram of another network-side equipment according to embodiments of the present invention.

Embodiments of the present invention provide a network-side equipment. The network-side equipment may be a base station, a server, etc, and it may be employed to realize the aforementioned method. As shown in FIG. 12, the network-side equipment provided by the embodiment includes:

a receiver 121, configured to receive scheduling information transmitted by a terminal.

Where, the scheduling information includes a requested scheduling rate requested by the terminal request and/or requested amount of scheduling data requested by the terminal.

In particular, the requested scheduling rate is a service data transmission rate required by the terminal when running the service, where the requested amount of scheduling data is amount of data required to be received by the terminal when running the service.

A processor 122, configured to determine a scheduling rate according to scheduling information received by the receiver 121.

Optionally, the processor 122 is specifically configured to determine a downlink scheduling rate according to the scheduling information.

In particular, the processor 122 is specifically configured to determine the requested scheduling rate as the scheduling rate, in a case that the scheduling information includes the requested scheduling rate.

Alternatively, determine the scheduling rate according to the requested amount of scheduling data and a first preset time value, in a case that the scheduling information includes the requested amount of scheduling data.

The processor 122 is specifically configured to, in a case that the scheduling information includes the requested amount of scheduling data, determine requested transmission rate according to a formula: $v=S/t$, and determine the requested transmission rate as the scheduling rate.

Where, v is the requested transmission rate, S is the requested amount of scheduling data, and t is the first preset time value.

Preferably, the processor 122 is specifically configured to determine the scheduling rate according to the scheduling information and a preset maximum transmission rate.

In particular, the processor 122 is specifically configured to, in a case that the scheduling information includes the requested scheduling rate, if the requested scheduling rate is greater than the preset maximum transmission rate, determine the preset maximum transmission rate as the scheduling rate. If the requested scheduling rate is less than the preset maximum transmission rate, determine the requested scheduling rate as the minimum rate value of the scheduling rate, determine the preset maximum transmission rate as the maximum rate value of the scheduling rate, and determine a value between the minimum rate value and the maximum value as the scheduling rate.

In a case that the scheduling information includes the requested amount of scheduling data, determine a requested transmission rate according to the requested amount of scheduling data and the first preset time value; and if the requested transmission rate is greater than the preset maximum transmission rate, determine the preset maximum transmission rate as the scheduling request. If the requested transmission rate is less than the preset maximum transmission rate, determine the requested transmission rate as a minimum rate value of the scheduling rate, determine the preset maximum transmission rate as a maximum rate value of the scheduling rate, and determine a value between the minimum rate value and the maximum value as the scheduling rate.

The processor 122 is further configured to allocate a transmission resource for the terminal according to a determined scheduling rate.

Optionally, the processor 122 is specifically configured to allocate a downlink transmission resource for the terminal according to the determined downlink scheduling rate.

Figure 13:
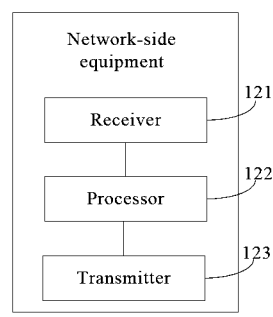
FIG. 13 is a second block diagram of another network-side equipment according to embodiments of the present invention.

The network-side equipment, as shown in FIG. 13, further includes: a transmitter 123, configured to transmit data to be transmitted of a service to the terminal by using the transmission resource allocated by the processor 122.

Where, the transmitter 123 is also configured to transmit configuration information to the terminal.

In particular, the configuration information is a triggering condition that is configured for the terminal, and is used for triggering the terminal to determine and transmit the scheduling information.

Where, the triggering condition includes at least one of the conditions as follows: amount of data to be run stored in a buffer area is zero; downloading data of a service to a buffer area is started; amount of data to be run stored in a buffer area is less than or equal to a first preset value; amount of data to be run stored in a buffer area is greater than or equal to a second preset value, where the second preset value is greater than the first preset value; all data to be run of a service has been buffered in a buffer area; a feedback cycle of the scheduling information is arrived; a time length for running, which corresponds to amount of data to be run stored in a buffer area, is zero; a time length for running, which corresponds to amount of data to be run stored in a buffer area, is less than or equal to a third preset value; and a time length for running, which corresponds to amount of data to be run stored in a buffer area, is greater than or equal to a forth preset value, where the forth preset value is greater than the third preset value.

The aforementioned receiver 121 is also configured to receive service state information transmitted by the terminal.

The service state information is the current state of the service.

Where, the service state information includes at least one of the states as follows: a state in which the service is suspended; a state in which the service is ended; a state of starting downloading service data to a buffer area; a state in which amount of data to be run of the service stored in a buffer area is less than or equal to a first preset value; a state in which amount of data to be run stored in a buffer area is greater than or equal to a second preset value; a state in which a time length for running, which corresponds to amount of data to be run of a service stored in a buffer area, is less than or equal to a third preset value; a state in which a time length for running, which corresponds to amount of data to be run of a service stored in a buffer area, is greater than or equal to a forth preset value; and a state of all data to be run of a service has been buffered in a buffer area.

Optionally, the processor 122 is specifically configured to determine the scheduling rate according to the scheduling information, the service state information, and the preset maximum transmission rate.

In particular, if the service state information includes the state in which the service is suspended or the state of starting downloading service data to the buffer area, the processor 122 shall raise the scheduling priority of the service, and determine a rate no greater than the preset maximum transmission rate as the scheduling rate.

Where, when the service is in a suspended state or a state of starting downloading service data to a buffer area, the processor 122 determines a rate no greater than the preset maximum transmission rate as the scheduling rate. Preferably, regardless of whether the requested scheduling rate in the scheduling information, or the requested transmission rate obtained according to the data amount of the request scheduling in the scheduling information is greater than or equal to or less than the preset maximum transmission rate, determine the preset maximum transmission rate as the scheduling rate. Meanwhile, raise the scheduling priority of the service.

It should be noted that, if, at the current moment, in the network-side equipment, the scheduling rate capable of being allocated to the terminal cannot reach the preset maximum transmission rate, determine the maximum transmission rate, which can be allocated by the network-side equipment to the terminal at current moment, as the scheduling rate.

If the service state information includes: the state in which amount of data to be run of the service stored in the buffer area is less than or equal to the first preset value, or the state in which the time length for running, which corresponds to the amount of data to be run of the service stored in the buffer area, is less than or equal to the third preset value, the processor 122 shall raise the scheduling priority of the service, and determine a rate no greater than the preset maximum transmission rate as the scheduling rate.

Where, when buffering of the service has been started but the buffer amount is little, in a case that the requested scheduling rate in the scheduling information or the requested transmission rate obtained according to the requested amount of scheduling data is greater than the preset maximum transmission rate, the processor 122 determines the preset maximum transmission rate as the maximum rate value of the scheduling rate, and determines a rate no greater than the preset maximum transmission rate as the scheduling rate. Preferably, the processor 122 may determine a rate slightly less than the preset maximum transmission rate as the scheduling rate. In a case that the requested scheduling rate in the scheduling information or the requested transmission rate obtained according to the requested amount of scheduling data is no greater than the preset maximum transmission rate, the processor 122 determines the preset maximum transmission rate as the maximum rate value of the scheduling rate, determines the requested scheduling rate in the scheduling information or the request transmission rate obtained according to the data amount of the request scheduling as the minimum rate value of the scheduling rate, and determines a value between the minimum rate value and the maximum rate value as the scheduling rate.

If the service state information includes the state in which the amount of data to be run stored in the buffer area is greater than or equal to the second preset value, or the state in which the time length for running, which corresponds to the amount of data to be run of the service stored in the buffer area, is greater than or equal to the forth preset value, the processor 122 reduces a scheduling priority of the service, and, in a case that the requested scheduling rate in the scheduling information or the requested transmission rate obtained according to the requested amount of scheduling data is no greater than a guarantee rate, the processor 122 determines the requested scheduling rate in the scheduling information or a requested transmission rate obtained according to the requested amount of scheduling data as the maximum rate value of the scheduling rate; and, in a case that the requested scheduling rate in the scheduling information or the requested transmission rate obtained according to the requested amount of scheduling data is greater than the guarantee rate, the processor 122 determines a rate no greater than the guarantee rate as the scheduling rate.

Where, the guarantee rate is a minimum transmission rate guaranteeing normal running of the service.

When the service state information is the state in which the amount of data to be run stored in the buffer area is greater than or equal to the second preset value, or the state in which the time length for running, which corresponds to the amount of data to be run of the service stored in the buffer area, is greater than or equal to the forth preset value, it indicates that a buffer has buffered an enormous amount of data to be run of the service, at this time, the processor 122 may reduce the scheduling priority of the service, and reduce the scheduling rate, i.e., the transmission rate no greater than the guarantee rate is determined as the scheduling rate.

Embodiments of the present invention provide a network-side equipment. After receiving the scheduling information and service state information, the network-side equipment determines the service scheduling rate according to the scheduling information and the service state information, and allocates transmission resource to the terminal by utilizing the scheduling rate, and transmits the data to be transmitted of the service according to the transmission resource. According to the method, determining the scheduling rate of transmitting data from the network side according to the scheduling information fed back from the client side is realized, therefore, the probability of transmitting data to a terminal by a network-side equipment with a too high or too low scheduling rate is reduced, thereby improving system performance and system efficiency, and further reducing user's waiting time, thus improving user experience.

Figure 14:
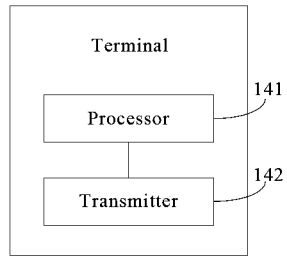
FIG. 14 is a first block diagram of another terminal according to embodiments of the present invention.

Embodiments of the present invention provide a terminal, which may be configured to realize the aforementioned methods. As shown in FIG. 14, the terminal includes: a processor 141, configured to determine scheduling information.

Where, the scheduling information includes a requested scheduling rate and/or requested amount of scheduling data requested by a local side.

In particular, the requested scheduling rate is a service data transmission rate required by the terminal when running the service, where the requested amount of scheduling data is amount of data required to be received by the terminal when running the service.

Where, the processor 141 specifically determines the requested scheduling rate according to the following formula: $v_q=(S_m-S_y-S_h)/(T_z-T_y)$, where $v_q$ is the requested scheduling rate, $S_m$ is selected data amount, $S_y$ is a amount of data has already been run in the selected data amount, $S_h$ is amount of data to be run in a buffer, $T_z$ is total run time of the service corresponding to the selected data amount, and $T_y$ is time for which the service corresponding to the selected data amount has already been run.

The requested amount of scheduling data is determined according to the following formula: the requested amount of scheduling data is determined according to a following formula: $S=S_m-S_y-S_h$, where $S_m$ is selected data amount, $S_y$ is a amount of data has already been run in the selected data amount, $S_h$ is amount of data to be run in a buffer.

A transmitter 142, configured to transmit to a network-side equipment the scheduling information determined by the processor 141, so that the network-side equipment determines a scheduling rate according to the scheduling information.

Figure 15:
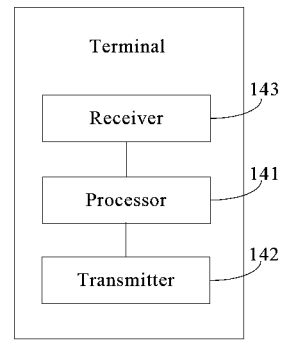
FIG. 15 is a second block diagram of another terminal according to embodiments of the present invention.

As shown in FIG. 15, the terminal also includes: a receiver 143, configured to receive data to be transmitted of a service transmitted by the network-side equipment.

The receiver 143 is also configured to receive configuration information transmitted by the network-side equipment.

Where, the configuration information includes a triggering condition used for triggering determination and transmitting of the scheduling information.

In particular, the triggering condition includes at least one of the conditions as follows: amount of data to be run stored in a buffer area is zero; downloading data of a service to a buffer area is started; amount of data to be run stored in a buffer area is less than or equal to a first preset value; amount of data to be run stored in a buffer area is greater than or equal to a second preset value, where the second preset value is greater than the first preset value; all data to be run of a service has been buffered in a buffer area; a feedback cycle of the scheduling information is arrived; a time length for running, which corresponds to amount of data to be run stored in a buffer area, is zero; a time length for running, which corresponds to amount of data to be run stored in a buffer area, is less than or equal to a third preset value; and a time length for running, which corresponds to amount of data to be run stored in a buffer area, is greater than or equal to a forth preset value, where the forth preset value is greater than the third preset value.

The processor 141 is specifically configured to, during the procedure of running the service, determine the scheduling information according to the amount of data to be transmitted of the service once any one triggering condition in the configuration information has been met.

The transmitter 142 is also configured to transmit the service state information to the network-side equipment.

Where, the service state information is the current state of the service.

In particular, the service state information includes at least one of the states as follows: a state in which the service is suspended; a state in which the service is ended; a state of starting downloading service data to a buffer area; a state in which amount of data to be run of the service stored in a buffer area is less than or equal to a first preset value; a state in which amount of data to be run stored in a buffer area is greater than or equal to a second preset value; a state in which a time length for running, which corresponds to amount of data to be run of a service stored in a buffer area, is less than or equal to a third preset value; a state in which a time length for running, which corresponds to amount of data to be run of a service stored in a buffer area, is greater than or equal to a forth preset value; and a state of all data to be run of a service has been buffered in a buffer area.

Embodiments of the present invention provide a terminal, where, during a procedure of running a services, when a triggering condition has been met, the terminal determines scheduling information and service state information according to the remaining transmission data amount of the service, transmits the scheduling information and service state information to a network-side equipment, so that the network-side equipment determines a scheduling rate according to the received scheduling information and service state information, determines the transmission resource allocated to the terminal according to the scheduling rate, and transmits the data to be transmitted of the service according to the transmission resource, therefore, the probability of transmitting data to a terminal by a network-side equipment with a too high or too low scheduling rate is reduced, thereby improving system performance and system efficiency, and further reducing user's waiting time, thus improving user experience.

Figure 16:
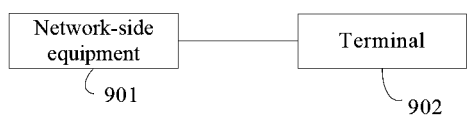
FIG. 16 is a schematic diagram of a system for resource scheduling according to embodiments of the present invention.

Embodiments of the present invention provide a system for resource scheduling, as shown in FIG. 16, the system includes a network-side equipment 901 and a terminal 902. The network-side equipment 901 is the network-side equipment described in the aforementioned embodiments, and the terminal 902 is the terminal provided by the aforementioned embodiments. Optionally, the network-side equipment is a base station.

It should be noted that, in all the embodiments of the present invention, a network-side equipment may be a base station, a media network-side equipment, or other devices. A terminal may be a user equipment, a media client, or other terminal devices. The present invention has no limitation thereof.

Figure 17:
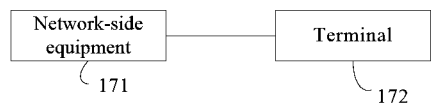
FIG. 17 is a schematic diagram of another resource scheduling system according to embodiments of the present invention.

Embodiments of the present invention additionally provide a system for resource scheduling system, as shown in FIG. 17, the system includes a network-side equipment 171 and a terminal 172. The network-side equipment 171 is another network-side equipment described in the aforementioned embodiments, and the terminal 172 is another terminal provided by the aforementioned embodiments.

Embodiments of the present invention provide a method, an apparatus, and a system for resource scheduling, where, during a procedure of running a services, when a triggering condition is met, the terminal determines scheduling information and service state information according to the remaining transmission data amount of the service, transmits the scheduling information and service state information to a network-side equipment. After the network-side equipment receives the scheduling information and the service state information, the network-side equipment determines a scheduling rate of the service according to the received scheduling information and the service state information, determines the transmission resource allocated to the terminal according to the scheduling rate, and transmits the data to be transmitted of the service by utilizing the transmission resource. Therefore, determining the scheduling rate of transmitting data from the network side according to the scheduling information fed back from the client side is realized and, thus, the probability of transmitting data to a terminal by a network-side equipment with a too high or too low scheduling rate is reduced, thereby improving system performance and system efficiency, and further reducing user's waiting time, thus improving user experience.

The above are only specific implementing modes of the present invention, but the protection scope of the present invention is not limited to this, variations or substitutions which can be easily thought of within the technical scope disclosed by embodiments of the present invention by any person skilled in the art, should fall within the protection scope of the present invention. Accordingly, the protection scope of the present invention should be subject to the protection scope of the claims.

What is claimed is:

1. A method for resource scheduling, comprising:
   receiving scheduling information transmitted by a terminal, wherein the scheduling information comprises a requested scheduling rate requested by the terminal;
   determining a scheduling rate according to the scheduling information and a preset maximum transmission rate, wherein:
      if the requested scheduling rate is greater than the preset maximum transmission rate, determining the preset maximum transmission rate as the scheduling rate, and
      if the requested scheduling rate is less than the preset maximum transmission rate, determining the requested scheduling rate as a minimum rate value of the scheduling rate, determining the preset maximum transmission rate as a maximum rate value of the scheduling rate, and determining a value between the minimum rate value and the maximum rate value as the scheduling rate;
   allocating a transmission resource to the terminal according to the determined scheduling rate; and
   transmitting data to be transmitted for a service to the terminal according to the transmission resource.

2. The method according to claim 1, wherein the scheduling information further comprises a requested amount of scheduling data, and wherein the determining the scheduling rate according to the scheduling information further comprises:
   determining the scheduling rate according to the requested amount of scheduling data and a first preset time value, wherein the first preset time value comprises a time delay value in quality of service (Qos) information of a service.

3. The method according to claim 2, wherein the determining the scheduling rate according to the requested amount of scheduling data and the first preset time value comprises:
   determining a requested transmission rate according to a formula: $v=S/t$, wherein v is the requested transmission rate, S is the requested amount of scheduling data, and t is the first preset time value; and
   determining the requested transmission rate as the scheduling rate.

4. The method according to claim 1,
   wherein the scheduling information further comprises a requested amount of scheduling data requested by the terminal; and wherein the determining the scheduling rate comprises:
  determining a requested transmission rate according to the requested amount of scheduling data requested by the terminal and a first preset time value;
  if the requested transmission rate is greater than the preset maximum transmission rate, determining the preset maximum transmission rate as the scheduling request; and
  if the request transmission rate is less than the preset maximum transmission rate, determining the request transmission rate as a minimum rate value, determining the maximum transmission rate as a maximum rate value, and determining a value between the minimum rate value and the maximum rate value as the scheduling rate.

5. The method according to claim 1, wherein, before determining the scheduling rate according to the scheduling information and the preset maximum transmission rate, the method further comprises:
  receiving service state information transmitted by the terminal, wherein the service state information is a current state of the service;
  wherein the determining the scheduling rate according to the scheduling information and the preset maximum transmission rate comprises determining the scheduling rate according to the scheduling information, the preset maximum transmission rate and the service state information.

6. The method according to claim 5, wherein the service state information comprises at least one of:
  a state in which the service is suspended;
  a state in which the service is ended;
  a state of starting downloading service data to a buffer area;
  a state in which amount of data to be run of the service stored in a buffer area is less than or equal to a first preset value;
  a state in which amount of data to be run stored in a buffer area is greater than or equal to a second preset value, wherein the second preset value is greater than the first preset value;
  a state in which a time length for running, which corresponds to amount of data to be run of a service stored in a buffer area, is less than or equal to a third preset value;
  a state in which a time length for running, which corresponds to amount of data to be run of a service stored in a buffer area, is greater than or equal to a forth preset value, wherein the forth preset value is greater than the third preset value; and
  a state of all data to be run of a service has been buffered in a buffer area.

7. A method for resource scheduling, comprising:
  determining scheduling information, wherein the scheduling information comprises a requested scheduling rate requested by a local side;
  transmitting the scheduling information to a network-side equipment, so that the network-side equipment determines a scheduling rate according to the scheduling information and a preset maximum transmission rate, wherein:
    if the requested scheduling rate is greater than the preset maximum transmission rate, determining the preset maximum transmission rate as the scheduling rate, and
    if the requested scheduling rate is less than the preset maximum transmission rate, determining the requested scheduling rate as a minimum rate value of the scheduling rate determining the preset maximum transmission rate as a maximum rate value of the scheduling rate, and determining a value between the minimum rate value and the maximum rate value as the scheduling rate; and
  receiving data to be transmitted for a service transmitted by the network-side equipment.

8. The method according to claim 7,
wherein the scheduling information further comprises a requested amount of scheduling data requested by the local side, and
wherein the requested scheduling rate is determined according to a following formula:

$$v_q = (S_m - S_y - S_h) / (T_z - T_y),$$

wherein $v_q$ is the requested scheduling rate, $S_m$ is a selected data amount, $S_y$ is a amount of data that has already been run in the selected data amount, $S_h$ is an amount of data to be run in a buffer, $T_z$ is a total run time of the service corresponding to the selected data amount, and $T_y$ is time for which the service corresponding to the selected data amount has already been run.

9. The method according to claim 7,
wherein the scheduling information further comprises a requested amount of scheduling data requested by the local side, and
wherein the requested amount of scheduling data is determined according to a following formula:

$$S = S_m - S_y - S_h,$$

wherein $S_m$, is a selected data amount, $S_y$ is an amount of data that has already been run in the selected data amount, $S_h$ is an amount of data to be run in a buffer.

10. The method according to claim 7, further comprising:
  determining a state of a service, and
  transmitting service state information to the network-side equipment, wherein the service state information is a current state of the service.

11. The method according to claim 10, wherein the service state information comprises at least one of:
  a state in which the service is suspended;
  a state in which the service is ended;
  a state of starting downloading service data to a buffer area;
  a state in which amount of data to be run of the service stored in a buffer area is less than or equal to a first preset value;
  a state in which amount of data to be run of the service stored in a buffer area is greater than or equal to a second preset value, wherein the second preset value is greater than the first preset value;
  a state in which a time length for running, which corresponds to amount of data to be run of a service stored in a buffer area, is less than or equal to a third preset value;
  a state in which a time length for running, which corresponds to amount of data to be run of a service stored in a buffer area, is greater than or equal to a forth preset value, wherein the forth preset value is greater than the third preset value; and
  a state of all data to be run of a service has been buffered in a buffer area.

12. A network-side equipment, comprising:
a receiver, configured to receive scheduling information transmitted by a terminal, wherein the scheduling information comprises a requested scheduling rate requested by the terminal;
a processor, configured to:
   determine a scheduling rate according to scheduling information received by the receiver and a preset maximum transmission rate wherein:
      if the requested scheduling rate is greater than the preset maximum transmission rate, determining the preset maximum transmission rate as the scheduling rate, and
      if the requested scheduling rate is less than the preset maximum transmission rate, determining the requested scheduling rate as a minimum rate value of the scheduling rate determining the preset maximum transmission rate as a maximum rate value of the scheduling rate, and determining a value between the minimum rate value and the maximum rate value as the scheduling rate; and
   allocate a transmission resource for the terminal according to the determined scheduling rate; and
a transmitter, configured to transmit data to be transmitted for a service to the terminal according to the transmission resource.

13. The network-side equipment according to claim 12, wherein the scheduling information further comprises a requested amount of scheduling data requested by the terminal, and wherein the processor is further configured to:
   determine the scheduling rate according to the requested amount of scheduling data and a first preset time value.

14. The network-side equipment according to claim 13, wherein the processor is further configured to determine a requested transmission rate according to a formula:

$$v = S/t,$$

wherein v is the requested transmission rate, S is the requested amount of scheduling data, and t is the first preset time value, and determine the requested transmission rate as the scheduling rate.

15. The network-side equipment according to claim 12, wherein:
   the receiver is further configured to receive service state information transmitted by the terminal, wherein the service state information is a current state of the service; and
   the processor is further configured to determine the scheduling rate according to the scheduling information, the preset maximum transmission rate and the service state information.

16. The network-side equipment according to claim 15, wherein the service state information comprises at least one of:
   a state in which the service is suspended;
   a state in which the service is ended;
   a state of starting downloading service data to a buffer area;
   a state in which amount of data to be run of the service stored in a buffer area is less than or equal to a first preset value;
   a state in which amount of data to be run of the service stored in a buffer area is greater than or equal to a second preset value, wherein the second preset value is greater than the first preset value;
   a state in which a time length for running, which corresponds to amount of data to be run of a service stored in a buffer area, is less than or equal to a third preset value;
   a state in which a time length for running, which corresponds to amount of data to be run of a service stored in a buffer area, is greater than or equal to a forth preset value, wherein the forth preset value is greater than the third preset value; and
   a state of all data to be run of a service has been buffered in a buffer area.

17. A terminal, comprising:
a processor, configured to determine scheduling information, wherein the scheduling information comprises a requested scheduling rate requested by a local side;
a transmitter configured to transmit to a network-side equipment the scheduling information, so that the network-side equipment determines a scheduling rate according to the scheduling information and a preset maximum transmission rate, wherein:
   if the requested scheduling rate is greater than the preset maximum transmission rate, determining the preset maximum transmission rate as the scheduling rate, and
   if the requested scheduling rate is less than the preset maximum transmission rate, determining the requested scheduling rate as a minimum rate value of the scheduling rate, determining the preset maximum transmission rate as a maximum rate value of the scheduling rate, and determining a value between the minimum rate value and the maximum rate value as the scheduling rate; and
a receiver configured to receive data to be transmitted for a service transmitted by the network-side equipment.

18. The terminal according to claim 17,
wherein the scheduling information further comprises a requested amount of scheduling data requested by the local side, and
wherein the requested scheduling rate is determined according to a following formula:

$$v_q = (S_m - S_y - S_h) / (T_z - T_y),$$

wherein $v_q$ is the requested scheduling rate, $S_m$ is a selected data amount, $S_y$ is an amount of data that has already been run in the selected data amount, $S_h$ is an amount of data to be run in a buffer, $T_z$ is a total run time of the service corresponding to the selected data amount, and $T_y$ is time for which the service corresponding to the selected data amount has already been run.

19. The terminal according to claim 17,
wherein the scheduling information further comprises a requested amount of scheduling data requested by the local side, and
wherein the requested amount of scheduling data is determined according to a following formula:

$$S = S_m - S_y - S_h,$$

wherein $S_m$ is a selected data amount, $S_y$ is an amount of data that has already been run in the selected data amount, and $S_h$ is an amount of data to be run in a buffer.

20. The terminal according to claim 17, wherein:
the receiver is further configured to receive configuration information transmitted by the network-side equipment, wherein the configuration information comprises a triggering condition used for triggering determination and transmitting of the scheduling information; and the processor is further configured to determine the scheduling information, if any one triggering condition in the configuration information has been met.

21. The terminal according to claim 17, wherein the transmitter is further configured to transmit service state information to a network-side equipment, wherein the service state information is a current state of the service.

22. The method according to claim 6, wherein the determining the scheduling rate according to the scheduling information, the preset maximum transmission rate and the service state information comprises at least one of:

if the service state information includes the state in which the service is suspended or the state of starting downloading service data to the buffer area, raising the scheduling priority of the service, and determining a rate no greater than the preset maximum transmission rate as the scheduling rate;

if the service state information includes: the state in which amount of data to be run of the service stored in the buffer area is less than or equal to the first preset value, or the state in which the time length for running, which corresponds to the amount of data to be run of the service stored in the buffer area, is less than or equal to the third preset value, raising a scheduling priority of the service, and determining a rate no greater than the preset maximum transmission rate as the scheduling rate;

if the service state information includes the state in which the amount of data to be run stored in the buffer area is greater than or equal to the second preset value, or the state in which the time length for running, which corresponds to the amount of data to be run of the service stored in the buffer area, is greater than or equal to the forth preset value, reducing a scheduling priority of the service, and, in a case that the requested scheduling rate in the scheduling information or the requested transmission rate obtained according to the requested amount of scheduling data is no greater than a guarantee rate, determining the requested scheduling rate in the scheduling information or a requested transmission rate obtained according to the requested amount of scheduling data as the maximum rate value of the scheduling rate; and, in a case that the requested scheduling rate in the scheduling information or the requested transmission rate obtained according to the requested amount of scheduling data is greater than the guarantee rate, determining a rate no greater than the guarantee rate as the scheduling rate, wherein the guarantee rate is a minimum transmission rate guaranteeing normal running of the service.

23. The network-side equipment according to claim 15, wherein the processor is further configured to perform at least one of:

if the service state information includes the state in which the service is suspended or the state of starting downloading service data to the buffer area, raise the scheduling priority of the service, and determine a rate no greater than the preset maximum transmission rate as the scheduling rate;

if the service state information includes: the state in which amount of data to be run of the service stored in the buffer area is less than or equal to the first preset value, or the state in which the time length for running, which corresponds to the amount of data to be run of the service stored in the buffer area, is less than or equal to the third preset value, raise a scheduling priority of the service, and determine a rate no greater than the preset maximum transmission rate as the scheduling rate;

if the service state information includes the state in which the amount of data to be run stored in the buffer area is greater than or equal to the second preset value, or the state in which the time length for running, which corresponds to the amount of data to be run of the service stored in the buffer area, is greater than or equal to the forth preset value, reduce a scheduling priority of the service, and, in a case that the requested scheduling rate in the scheduling information or the requested transmission rate obtained according to the requested amount of scheduling data is no greater than a guarantee rate, determine the requested scheduling rate in the scheduling information or a requested transmission rate obtained according to the requested amount of scheduling data as the maximum rate value of the scheduling rate; and, in a case that the requested scheduling rate in the scheduling information or the requested transmission rate obtained according to the requested amount of scheduling data is greater than the guarantee rate, determine a rate no greater than the guarantee rate as the scheduling rate, wherein the guarantee rate is a minimum transmission rate guaranteeing normal running of the service.

\* \* \* \* \*